Nov. 10, 1942.     S. H. BENJAMIN     2,301,172
SAFETY RAZOR
Filed July 12, 1941     5 Sheets-Sheet 1

INVENTOR.
Sidney H. Benjamin
BY
ATTORNEY

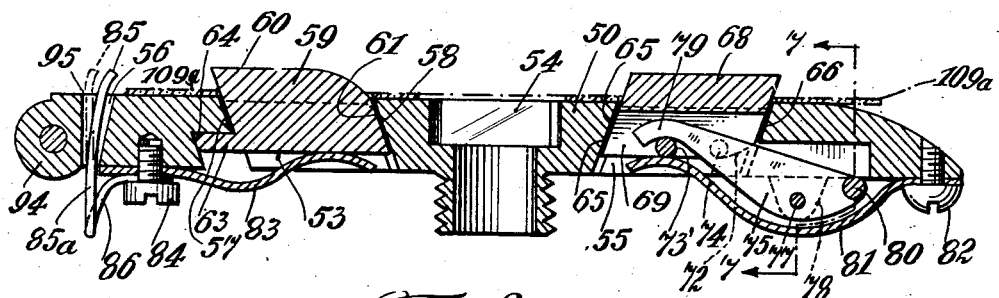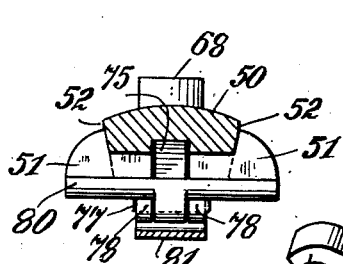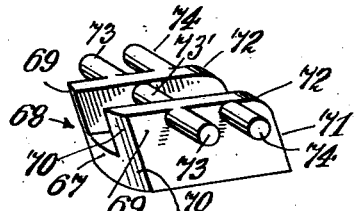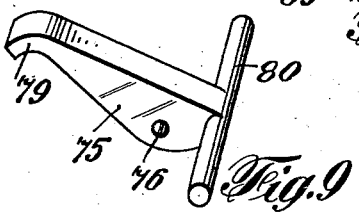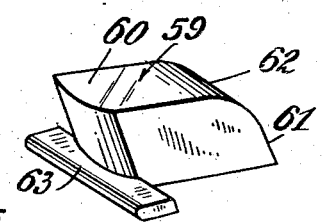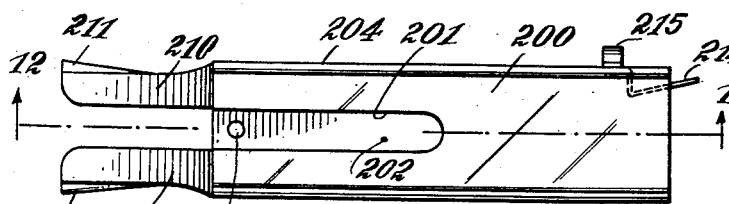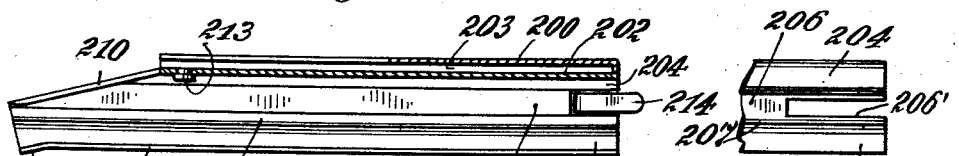

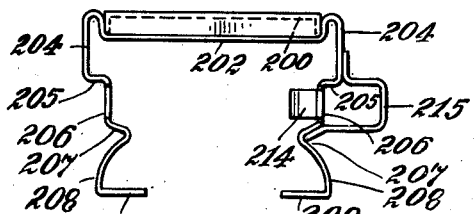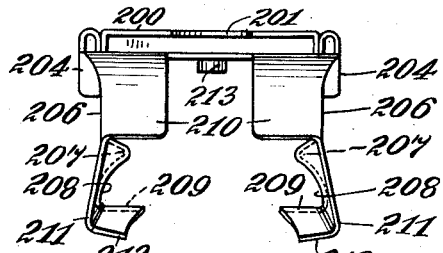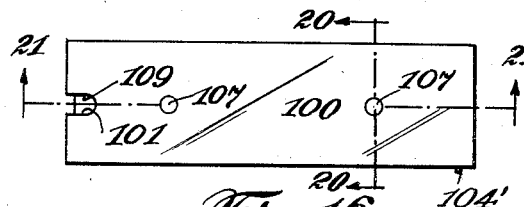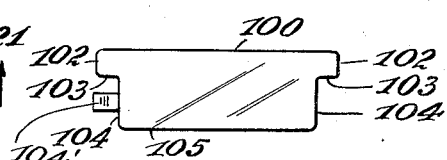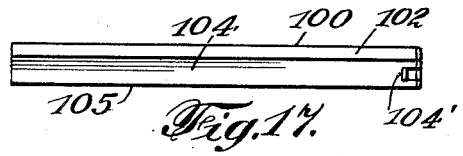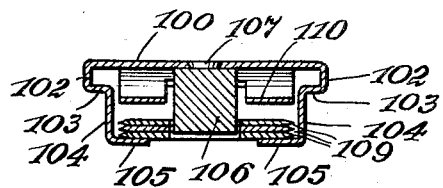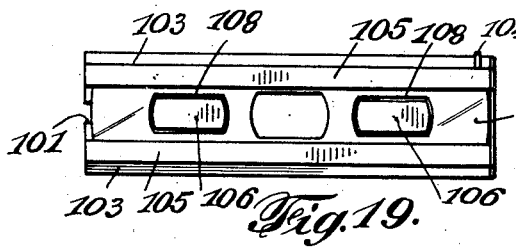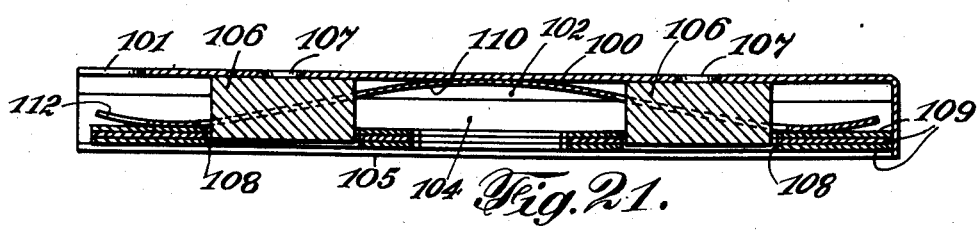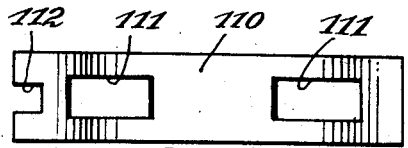

Nov. 10, 1942.    S. H. BENJAMIN    2,301,172
SAFETY RAZOR
Filed July 12, 1941    5 Sheets-Sheet 4

INVENTOR.
Sidney H. Benjamin
BY
ATTORNEY

Nov. 10, 1942.　　　　S. H. BENJAMIN　　　　2,301,172
SAFETY RAZOR
Filed July 12, 1941　　　　5 Sheets-Sheet 5

INVENTOR.
Sidney H. Benjamin
BY
ATTORNEY

Patented Nov. 10, 1942

2,301,172

UNITED STATES PATENT OFFICE 2,301,172

SAFETY RAZOR

Sidney H. Benjamin, Milwaukee, Wis.

Application July 12, 1941, Serial No. 402,072

8 Claims. (Cl. 30—40)

My invention relates to safety razors and refers particularly to safety razors adapted to receive and retain razor blades upon the guard members thereof.

One of the objects of my invention is safety razors of such construction that blades may be retained upon the guard members thereof, irrespective of a top member of the razor.

Another object of my invention is safety razors of such construction that it is practically impossible to properly deposit a blade thereon, or to remove a blade previously deposited thereon, without the assistance of devices particularly adapted for those purposes.

Another object of my invention is safety razors of such construction that a previously deposited blade may be released therefrom and a new blade may be deposited thereon by a single movement of a device adapted therefor.

Other objects of the devices of my invention will be evident upon a consideration of this specification and its accompanying drawings.

In the accompanying drawings illustrating modified forms of devices of my invention, similar parts are designated by similar numerals.

Figure 6 is an enlarged section through the lines 6—6 of Figure 1 with blade in dot-and-dash lines upon it.

Figure 7 is a section through the lines 7—7 of Figure 6.

Figure 8 is a perspective view of the forward movable stud of my device inverted.

Figure 9 is a perspective view of the trip mechanism of my device.

Figure 10 is a perspective view of the rearward movable stud of my device.

Figure 11 is a top plan view of a blade magazine holder adapted for use with my device.

Figure 12 is a section through the line 12 of Figure 11.

Figure 13 is a fragmentary front view of the device of Figure 11.

Figure 14 is a rear end view of Figure 11.

Figure 15 is a front end view of Figure 11.

Figure 16 is a top plan view of a blade magazine adapted for use with my device.

Figure 17 is a side view of Figure 16.

Figure 18 is a rear end view of Figure 16.

Figure 19 is a bottom view of Figure 16.

Figure 20 is a section through the lines 20—20 of Figure 16.

Figure 21 is an enlarged section through the lines 21—21 of Figure 16.

Figure 22 is a top plan view of the spring member of Figure 16.

Figure 1:
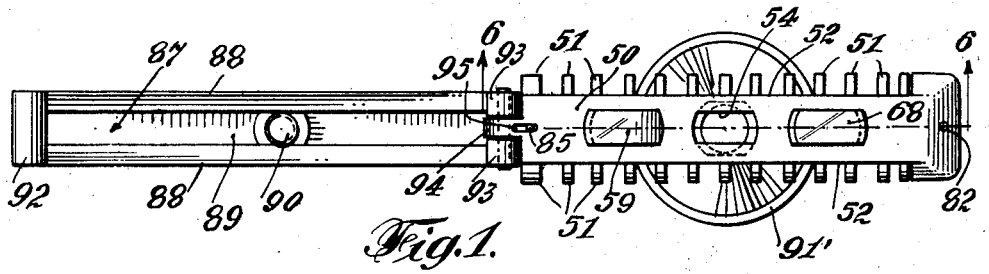
Figure 1 is a top plan view of one form of a device of my invention, shown in open positon with blades omitted.

The particular form of a device of my invention shown in Figures 1 to 26 inclusive comprises a guard plate 50 having a plurality of spaced teeth 51, 51 extending from each side thereof, a longitudinal shoulder 52 being formed on each side of the guard plate between the edge of the plate 50 and the upper faces of the teeth 51. The guard plate 50 has three openings 53, 54 and 55 therethrough and a recess 56 in the rearward portion thereof.

The forward and rearward faces 57 and 58 of the rearward opening 53 are inclined at an angle of seventy degrees toward the center of the guard plate and are adapted for the reception of a rearward vertically movable razor blade stud 59, the shape of which is clearly shown in Figure 10. This stud 59 has a face 57 and a face 61 inclined at a seventy degree angle to correspond to those of the opening 53, the top edge 62 is rounded as shown and the forward bottom portion of the stud carries a stop bar 63. The opening 53 is under-cut at the lower portion forming a shoulder 64 upon which the stop bar 63 can abut. The position of the movable stud 59 within the opening 53 of the guard is clearly shown in Figure 6.

The forward and rearward faces 65 and 66 of the opening 55 are inclined at an angle of seventy degrees toward the center of the guard plate 50 and are adapted for the reception of a forward vertically movable razor blade stud 68, the shape of which is clearly shown in Figure 8 in inverted position.

This forward movable stud has the top member 67 and the two downwardly extended spaced members 69 and 69, the faces 70 and 71 are inclined to abut upon the faces 65 and 66 of the opening 55 and the edges 72, 72 are rounded as shown. This movable stud has a bar 73, the central portion 73' of which is actuated by the hook 79 of the member 75, and the two stops 74, 74.

The trip operating member of the forward movable stud shown in Figure 9 comprises the revoluble member 75 having an opening 76, therethrough for the insertion of an annular shaft 77 upon which the trip member 75 may revolve, the shaft 77 being supported by two opposed lugs 78, 78 carried by the guard plate 50. The forward end 79 of the member 75 is hook-shaped and the other end portion of the member 75 carries the trip bar 80.

A leaf spring 81 attached to the underside of the guard by means of the screw 82 abuts upon the two lower faces of the extended members 69 and 69 of the stud, forcing the stud upwardly beyond the upper face of the guard as shown in Figure 6, the stud being prevented from further upward movement by the abutment of the members 73 and 74 upon the guard.

The rearward movable stud 59 is resiliently retained in the position shown in Figure 6 extending above the upper face of the guard plate 50 by means of the leaf spring 83 attached to the guard by means of the screw 84.

Figure 2:
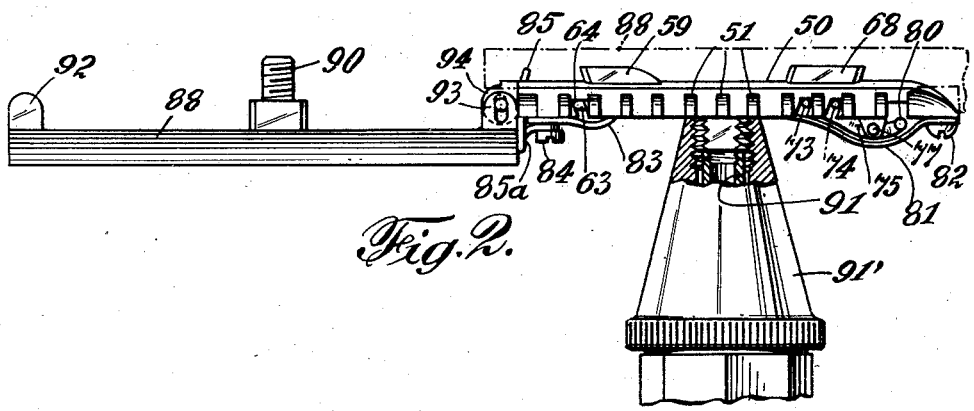
Figure 2 is a side view of Figure 1 partly in section.
Figure 3:
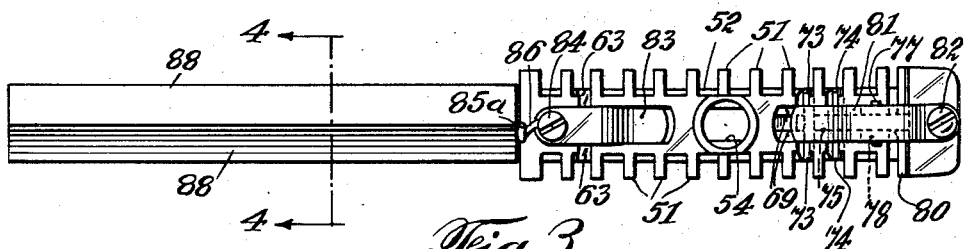
Figure 3 is a bottom view of Figure 2 with handle omitted.
Figures 4, 5:
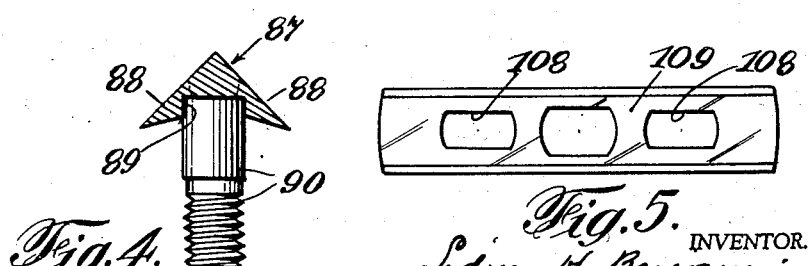
Figure 4 is an enlarged section through the lines 4—4 of Figure 3.
Figure 5 is a top plan view of a razor blade adapted for use with the devices of the above-mentioned figures.
Figure 23:
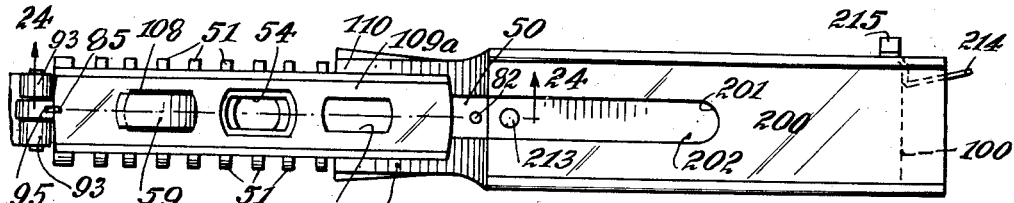
Figure 23 is a top plan view of a magazine holder with its contained blade magazine about to enter the device of Figure 1.
Figure 24:
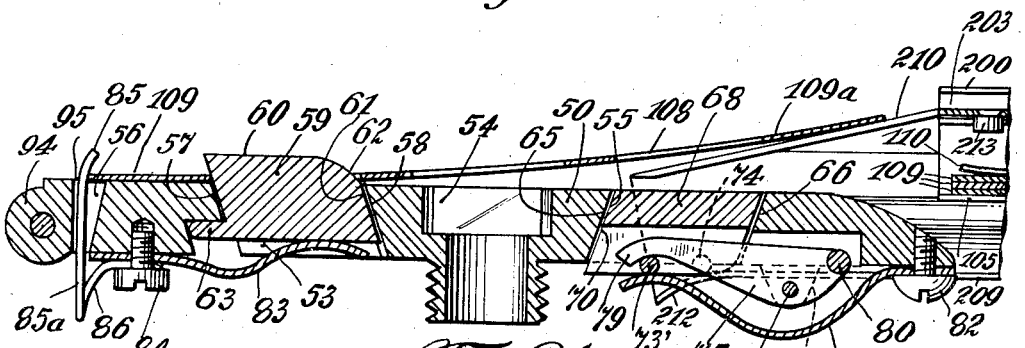
Figure 24 is an enlarged view of a section through the lines 24—24 of Figure 23.

Pivotally positioned at the rearward end of the guard 50 is a hook-shaped blade catch member 85 movable to and fro within the recess 56 of the guard 50, and being resiliently retained within said recess 56 and in abutment upon the inner end face of the recess as shown in Figure 24 by means of its lower spring arm 86 carried by the screw 84. The extension 85a of the member 85, prevents the cap from falling below a horizontal position when open as shown in Figure 2.

The cap, or top member of this form of my device comprises the elongated member 87 having the two flanged sides 88, 88, thus forming a recess 89 for the reception of the movable studs when the device is in position for shaving. A centrally positioned extended externally threaded stud 90 is adapted to be inserted through the opening 54 of the guard and to be abutted upon the guard by a revolution of the internally threaded sleeve 91 of the handle 91'. One end of the cap has the extended member 92 adapted to cover one end of the guard 50 when the device is in closed position, while the other end of the cap carries the extended members 93, 93 which acts as a hinge member to form a hinge with the extended member 94 of the guard as clearly shown in the drawings. This extended hinge member 94 of the guard has a recess 95 in alignment with the recess of 56 of the guard in order that the blade catch 85 may have sufficient movement to accomplish its purpose.

In order that the operation of the razor of my invention may be clearly understood, I will explain the devices whereby the razor operations may be accomplished.

The particular operating devices described by me for the operation of my razor comprise a magazine carrying a plurality of stacked blades and a holding device for such blade magazine adapted to remove a used blade from said razor and deposit a new blade thereon, the razor being of such construction that the removal of a used blade and the deposit of a new blade is practically impossible without the assistance of devices of this general character.

One form of a blade magazine adapted for the described purposes is shown in Figures 16 to 19, and comprises a container having the top member 100 with a recess 101 in its forward end; the two side members, each comprising the downwardly extended member 102, extending into the inwardly extended member 103, the downwardly extended member 104 and the inwardly extended member 105, the bottom being formed by the two spaced end members 105, 105. At least one end of the magazine is open to allow of the removal of a blade therefrom. Two blade retaining members 106, 106 extend downwardly from the top member 100 and are fixedly attached to the top 100 by means of rivets 107, 107. These blade retaining members 106, 106 are adapted to pass through openings 108, 108 in a stack of razor blades 109, 109, and are of such length as to pass through the said openings of all of the blades except the outermost one when the stack of blades is pressed in abutment against the inner face of the magazine members 105, 105. A leaf spring 110 having openings 111, 111 to allow the passage of the blade studs 106, 106 therethrough and having a recess 112 in alignment with the recess 101 of the top 100, is positioned within the magazine to press the blades 109, 109 against the inner face of the members 105, 105.

The particular form of a blade magazine holder adapted for co-ordinate operation with a blade magazine and a razor of my invention as shown in the accompanying drawings, Figures 11–15, comprises a casing having the top member 200 having a recess 201 therein and a horizontal partition 202 situated below the top 200 and forming a blade receiving chamber 203 therein.

The holder has two sides each comprising a U-shaped member 204, extending inwardly 205, thence downwardly 206, thence inwardly 207, thence into the curved member 208 and thence inwardly into a bottom member 209. It will be noted from the figures that the side members 204, 204 extend only to the forward end of the top 200, and the partition 202, and that the top forward portions of the side members 206, 206 are bent inwardly to form the two spaced members 210, 210 which in turn extend downwardly, these two members 210, 210 leading into the blade receiving chamber 203. The extreme free end portions 211, 211 of the side members 207 and 208 are flared slightly outwardly and the extreme free end portions 212, 212 of the bottom members 209, 209 are flared slightly downwardly. These flared portions are not absolutely essential but are preferred as they facilitate somewhat the entrance of the holder into the razor of my invention.

A stud 213 extends downwardly from the partition 202 and one side member 206 carries a Z-shaped resilient member 214, the central portion of which is normally within the passage formed by the sides 206, 206 to prevent the accidental displacement of a blade magazine carried by the holder, and a U-shaped guard member 215 prevents extreme removal of the member 214. A struck-out projection 104' from the side wall 104 is positioned to pass through the recess 206' of the side 206 of the holder to allow of the withdrawal of the magazine from the holder.

Figure 25:
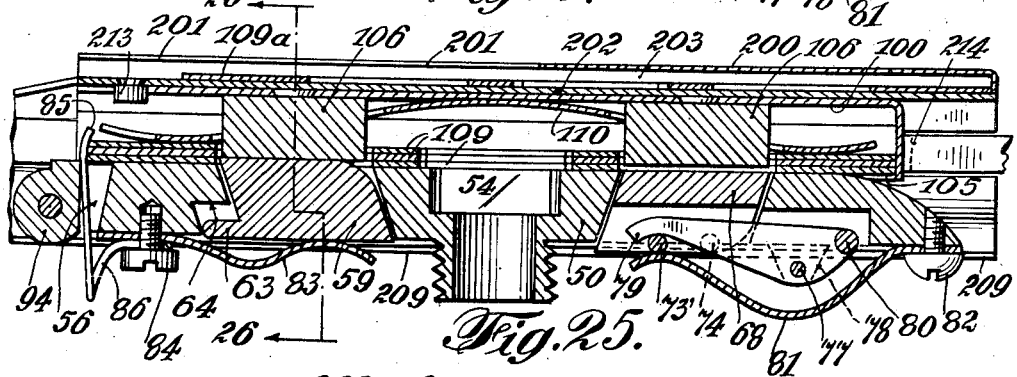
Figure 25 is an enlarged sectional view corresponding to Figure 24, with the holder completely introduced into the device of Figure 1.
Figure 26:
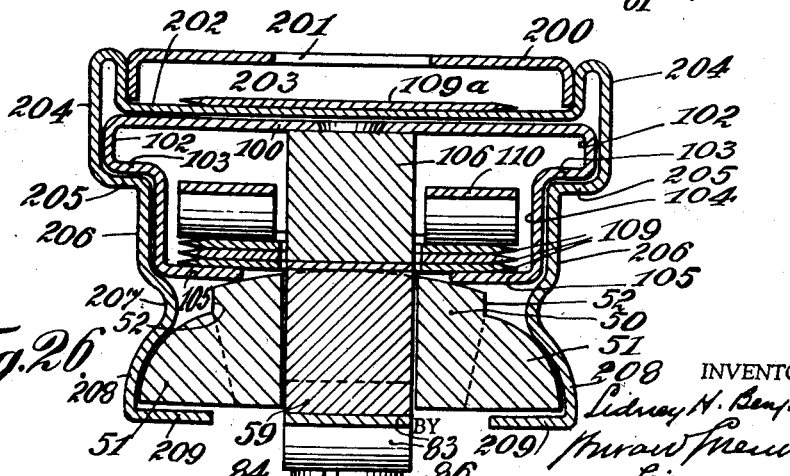
Figure 26 is an enlarged section through the lines 26—26 of Figure 25.
Figures 27, 29:
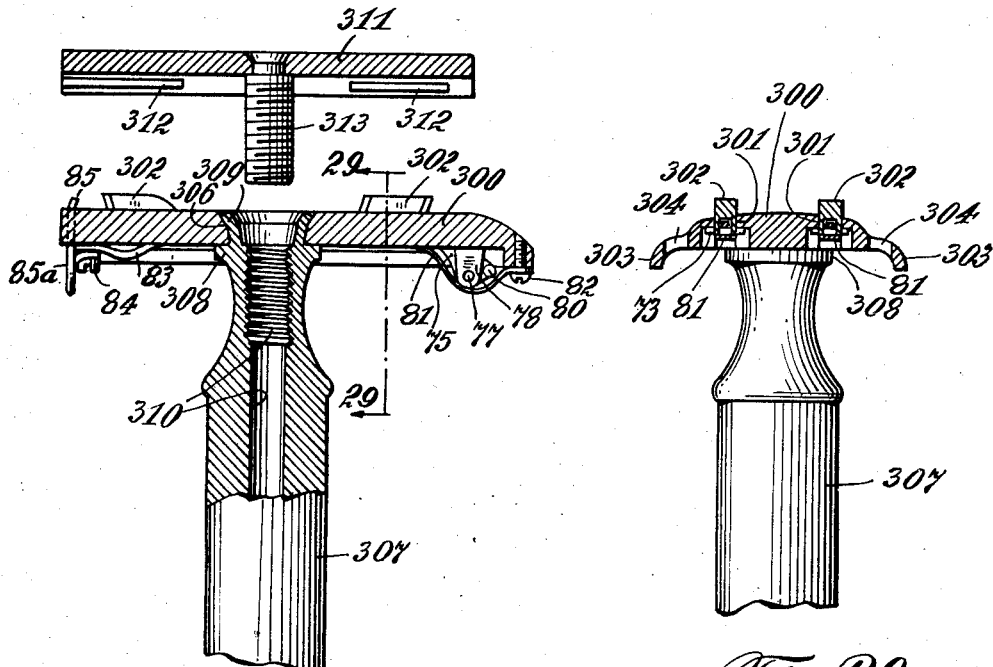
Figure 27 is a central vertical section of a modified form of my device with cap separated therefrom.
Figure 29 is a section through the lines 29—29 of Figure 27.
Figures 28, 30:
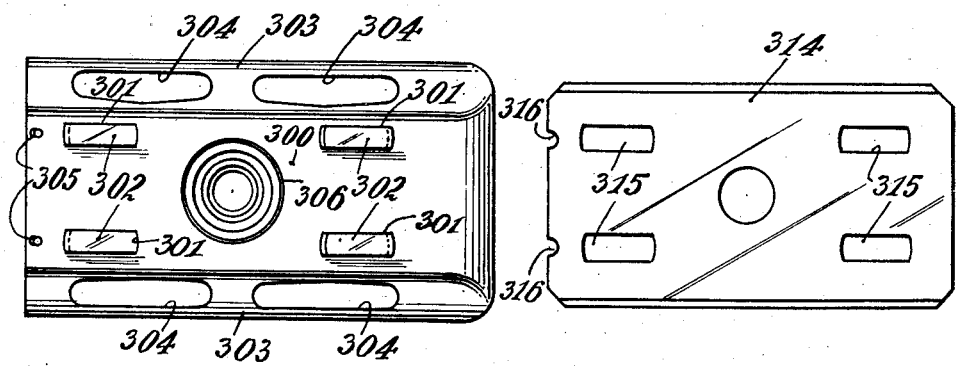
Figure 28 is a top plan view of the guard member of Figure 27.
Figure 30 is a top plan view of a blade adapted for use with the device of Figure 27.

Figures 24, 25 and 26 show particularly the arrangement of parts during the operation of the razor of my invention.

The blade magazine is placed in the magazine holder as shown in Figure 26.

Assuming that there is a used blade maintained in position upon the guard member by means of the movable studs 59 and 68, extending through openings in the blade 109 and by the blade retaining member 85 abuting upon and extending over the end of the blade. It is evident therefore, that the blade cannot be removed until the studs 59 and 68 are depressed until their upper face is flush, or below, the upper face of the guard.

The holder, with its contained magazine, is then introduced into the described razor, the trip bar 88 entering the flared ends of the magazine and being positioned above the bottom members 209, 209 of the holder, and the end of the deposited blade 109a being upon the upper faces of the members 210, 210 of the holder. When the devices are thus positioned, the holder is moved over the guard, during which process the trip bar 80 moves upwardly along the upper faces of the members 209, 209, thus revolving the member 75 about the bearing 77 and thus moving the operating bar 73 downwardly carrying the stud 68 downwardly until it is flush with the upper face of the guard, during which movement the free end portion of the deposited blade 109a will slide along the upper faces of the holder members 210, 210 toward the blade receiving chamber 203.

The devices will then be positioned as shown in Figure 24.

During these movements the holder is maintained in proper longitudinal position upon the guard as will be noticed particularly in Figure 26.

The inward movement of the holder and its contained blade magazine is continued until the devices have attained the position shown in Figure 25.

During this movement, the stud 68 is retained in depressed position, and the outermost blade in the magazine mounts over the movable stud 59 forcing it down until its upper face is flush, or below, the upper face of the guard, thus releasing the deposited blade 109a from retention by the stud 59, and the resiliency of the deposited blade 109a will release it from the hook member 85, and place it in the blade receiving chamber 203.

It will be noted that when the devices are in this position, the openings in the outermost blade 109 of the magazine are directly above the studs 59 and 68, which are still held in depressed positions, the resiliently controlled member 85 being in forced abutment against the end of the blade 109.

As the magazine is withdrawn the stud 59 will move upwardly and will enter the opening in the blade 109, and the spring pressed member 85 will move inwardly forcing the blade against the under-cut inclined face of the stud 59 thus maintaining it in position. As the holder is finally withdrawn, the release of the trip bar 88 will allow of the upward movement of the stud 68 into its aligned blade opening, thus securely attaching the blade to the guard, and the withdrawn holder will carry the previously deposited blade 109a with it in the blade receiving chamber 203.

The movable studs and the stud operating mechanism of the modified form of a device of my invention shown in Figures 27 to 30, inclusive, are similar to those previously shown and described, except that this form is adapted for use with blades having four openings for the reception of positioning studs instead of two openings as previously described, and hence there is a duplication of parts to accommodate blades of this character.

The guard member in this form of my device comprises a central body portion 300, having four openings 301, 301, 301, 301 for the reception of a corresponding number of movable studs 302, 302, 302, 302 of the construction previously described, the operating mechanism being also the same as that previously described except that it is duplicated, each portion operating a forward and a rearward stud, and hence the same numerals are employed in this modification as are shown in the previously described drawings.

If desired, the trip member can extend transversely across the guard and thus operate both sets of studs.

A further modification of this device is that the teeth of the previously described device have been substituted by a downwardly extended guide member 303, separated from the central body 300 by the openings 304, 304 on each side of the guard.

The guard has two elongated openings 305, 305 adapted to allow of the passage of the hook-like member therethrough and to allow its back-and-forth movement.

The guard has a centrally positioned annular opening 306, the faces of which are flared upwardly and outwardly.

The guard carries a handle having the grip portion 307, the flange 308 abuttable upon the under face of the guard and the annular flared portion 309, the outer face of which is abuttable upon the face of the opening 306. The handle also has the internally threaded annular recess 310, the handle being thus capable of a swivel movement with respect to the guard.

The cap comprises the top portion 311, the under face of the top portion 311 having recesses 312, 312 for the reception of the studs 302, 302 when the cap is in position upon the guard, and a downwardly extended threaded annular stud 313 capable of threading with the threaded portion of the handle.

The blade 314 adapted for use with this form of my device has four openings 315, 315 adapted to receive the studs 302, 302 and two recesses 316, 316 adapted to receive the hook-like members.

In assembling the device for shaving purposes, after the blade is properly positioned upon the guard, the threaded stud 313 of the cap is inserted into the threaded recess 310 of the handle, and the handle turned upon its axis until the cap is firmly in abutment upon the blade and the flange 308 abuts firmly upon the under face of the guard.

From the above description it is evident that the movable studs and the stud operating mechanism of my invention are applicable to razors irrespective of their size, or of the shape or number of their stud positioning openings, the adaption of the elements of my invention being thus adaptable by ordinary mechanical means; and hence I do not limit myself to the particular size, shape, number or arrangement of parts as shown.

What I claim is:

1. A safety razor comprising a guard member, a forward movable stud carried by said guard adapted to be moved angularly vertically above the upper face of said guard and into flush position with the upper face of said guard, the forward and rearward faces of said forward stud being inclined toward the center of said guard, resilient means adapted to retain said forward stud above the upper face of said guard, a trip member for said forward stud carried by said guard, means whereby a movement of said trip will depress said forward stud into a flush position with the upper face of said guard; a rearward movable stud carried by said guard adapted to be moved angularly vertically above the upper face of said guard and into flush position with the upper face of said guard, the forward and rearward faces of said rearward stud being inclined toward the center of said guard, resilient means adapted to retain said rearward stud above the upper face of said guard, a cap member for said razor, means adapted to abut said cap upon said guard and a handle for said razor.

2. A safety razor comprising a guard member, a forward movable stud carried by said guard adapted to be moved angularly vertically above the upper face of said guard and into flush position with the upper face of said guard, the forward and rearward faces of said forward stud being inclined toward the center of said guard, resilient means adapted to retain said forward stud above the upper face of said guard, a trip member for said forward stud below said guard, and carried by said guard, means whereby an upward movement of said trip will depress said forward stud into a flush position with the upper face of said guard; a rearward movable stud carried by said guard adapted to be moved angularly vertically above the upper face of said guard and into flush position with the upper face of said guard, the forward and rearward faces of said rearward stud being inclined toward the center of said guard, resilient means adapted to retain said rearward stud above the upper face of said guard, a cap member for said razor, means adapted to abut said cap upon said guard and a handle for said razor.

3. A safety razor comprising a guard member, a forward movable stud carried by said guard adapted to be moved angularly vertically above the upper face of said guard and into flush position with the upper face of said guard, the forward and rearward faces of said forward stud being inclined toward the center of said guard, resilient means adapted to retain said forward stud above the upper face of said guard, said forward stud being positioned in alignment with an opening in a blade positioned upon said guard when said forward stud is flush with the upper face of said guard, said forward stud being positioned to retain said blade upon said guard when it is in raised position through said opening in said blade, a trip member for said forward stud carried by said guard, means whereby a movement of said trip will depress said forward stud into a flush position with the upper face of said guard; a rearward movable stud carried by said guard adapted to be moved angularly vertically above the upper face of said guard and into flush position with the upper face of said guard, the forward and rearward faces of said rearward stud being inclined toward the center of said guard, said rearward stud being positioned in alignment with an opening in a blade positioned upon said guard when said rearward stud is flush with the upper face of said guard, said rearward stud being positioned to retain said blade upon said guard when it is in raised position through said opening in said blade, resilient means adapted to retain said rearward stud above the upper face of said guard, a cap member for said razor, means adapted to abut said cap upon said guard and a handle for said razor.

4. A safety razor comprising a guard member, a forward movable stud carried by said guard adapted to be moved angularly vertically above the upper face of said guard and into flush position with the upper face of said guard, the forward and rearward faces of said forward stud being inclined toward the center of said guard, resilient means adapted to retain said forward stud above the upper face of said guard, a trip member for said forward stud carried by said guard, means whereby a movement of said trip will depress said forward stud into a flush position with the upper face of said guard; a rearward movable stud carried by said guard adapted to be moved angularly vertically above the upper face of said guard and into flush position with the upper face of said guard, the forward and rearward faces of said rearward stud being inclined toward the center of said guard, resilient means adapted to retain said rearward stud above the upper face of said guard, a hook-shaped member pivotally carried by said guard at the rearward end thereof adapted to abut upon the upper face of a blade positioned upon said guard, resilient means adapted to retain said hook-shaped member in its forward position, a cap member for said razor, means adapted to abut said cap upon said guard and a handle for said razor.

5. A safety razor comprising a guard member, a forward movable stud carried by said guard adapted to be moved angularly vertically above the upper face of said guard and into flush position with the upper face of said guard, the forward and rearward faces of said forward stud being inclined toward the center of said guard, resilient means adapted to retain said forward stud above the upper face of said guard, a trip member for said forward stud carried by said guard, means whereby a movement of said trip will depress said forward stud into a flush position with the upper face of said guard; a rearward movable stud, the forward edge of which is rounded, carried by said guard adapted to be moved angularly vertically above the upper face of said guard and into flush position with the upper face of said guard, the forward and rearward faces of said rearward stud being inclined toward the center of said guard, resilient means adapted to retain said rearward stud above the upper face of said guard, a cap member for said razor, means adapted to abut said cap upon said guard and a handle for said razor.

6. A safety razor comprising a guard member, a forward movable stud carried by said guard adapted to be moved angularly vertically in a forward direction above the upper face of said guard and into flush position with the upper face of said guard, the forward and rearward faces of said forward stud being inclined toward the center of said guard, resilient means adapted to retain said forward stud above the upper face of said guard, a trip member for said forward stud carried by said guard, means whereby a movement of said trip will depress said forward stud into a flush position with the upper face of said guard; a rearward movable stud carried by said guard adapted to be moved angularly vertically in a rearward direction above the upper face of said guard and into flush position with the upper face of said guard, the forward and rearward faces of said rearward stud being inclined toward the center of said guard, resilient means adapted to retain said rearward stud above the upper face of said guard, a cap member for said razor, means adapted to abut said cap upon said guard and a handle for said razor.

7. A safety razor comprising a guard member, a forward movable stud carried by said guard adapted to be moved angularly vertically in a forward direction above the upper face of said guard and into flush position with the upper face of said guard, the forward and rearward faces of said forward stud being inclined toward the center of said guard, resilient means adapted to retain said forward stud above the upper face of said guard, said forward stud being positioned in alignment with an opening in a blade positioned upon said guard when said forward stud is flush with the upper face of said guard, said forward stud being positioned to retain said blade upon said guard when it is in raised positioned through said opening in said blade, a trip member for said forward stud carried by said guard, means whereby a movement of said trip will depress said forward stud into a flush position with the upper face of said guards; a rearward movable stud carried by said guard adapted to be moved angularly vertically in a rearward direction above the upper face of said guard and into flush position with the upper face of said guard, the forward and rearward faces of said rearward stud being inclined toward the center of said guard, said rearward stud being positioned in alignment with an opening in a blade positioned upon such guard when said rearward stud is flush with the upper face of said guard, said rearward stud being positioned to retain said blade upon said guard when it is in raised position through said opening in said blade, a cap member for said razor, means adapted to abut said cap upon said guard and a handle for said razor.

8. A safety razor comprising a guard member, a forward movable stud carried by said guard adapted to be moved angularly vertically in a forward direction above the upper face of said guard and into flush position with the upper face of said guard, the forward and rearward faces of said forward stud being inclined toward the center of said guard, resilient means adapted to retain said forward stud above the upper face of said guard, said forward stud being positioned in alignment with an opening in a blade positioned upon said guard when said forward stud is flush with the upper face of said guard, said forward stud being positioned to retain said blade upon said guard when it is in raised position through said opening in said blade, a trip member for said forward stud carried by said guard, means whereby a movement of said trip will depress said forward stud into a flush position with the upper face of said guard; a rearward movable stud, the forward edge of which is rounded, carried by said guard adapted to be moved angularly vertically in a rearward direction above the upper face of said guard and into flush position with the upper face of said guard, the forward and rearward faces of said rearward stud being inclined toward the center of said guard, said rearward stud being positioned in alignment with an opening in a blade positioned upon said guard when said rearward stud is flush with the upper face of said guard, said rearward stud being positioned to retain said blade upon said guard when it is in raised position through said opening in said blade, resilient means adapted to retain said rearward stud above the upper face of said guard, a hook-shaped member pivotally carried by said guard at the rearward end thereof adapted to abut upon the upper face of a blade positioned upon said guard, resilient means adapted to retain said hook-shaped member in its forward position, a cap member for said razor, means adapted to abut said cap upon said guard and a handle for said razor.

SIDNEY H. BENJAMIN.